W. CRIGHTON, W. WILLS & L. RASTETTER.
FEED WATER HEATER.
No. 65,547. Patented June 11, 1867.
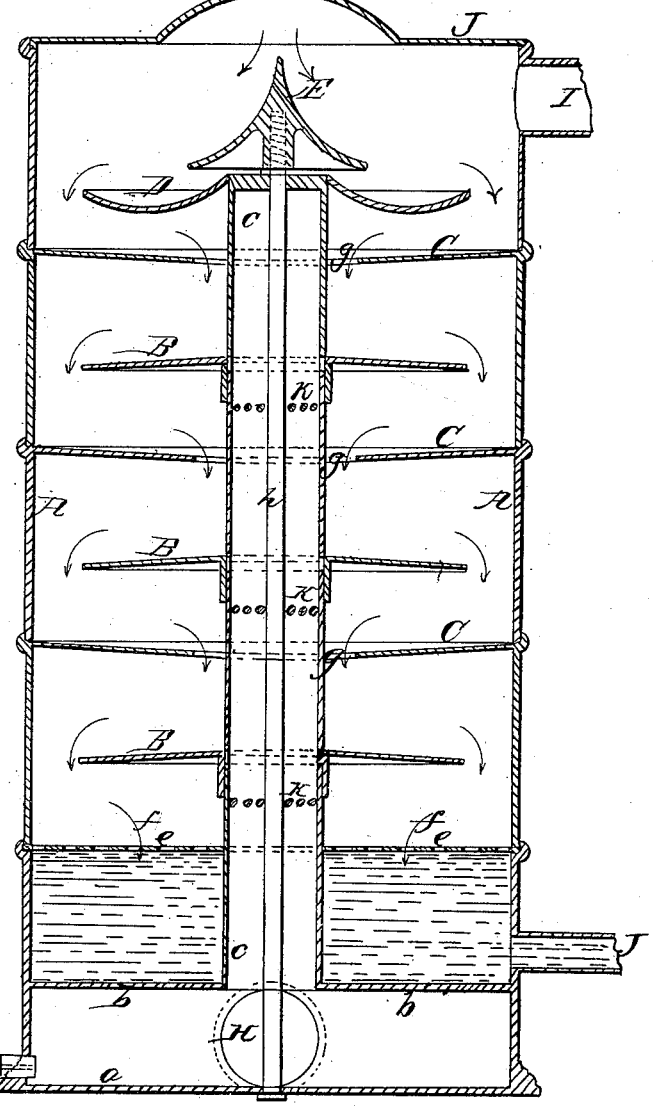

United States Patent Office

WILLIAM CRIGHTON, WILLIAM WILLS, AND LOUIS RASTETTER, OF FORT WAYNE, INDIANA.

Letters Patent No. 65,547, dated June 11, 1867.

---

IMPROVEMENT IN FEED-WATER HEATERS

---

The Schedule referred to in these Letters Patent and making part of the same.

---

TO ALL WHOM IT MAY CONCERN:

Be it known that we, WILLIAM CRIGHTON, WILLIAM WILLS, and LOUIS RASTETTER, of Fort Wayne, in the county of Allen, and State of Indiana, have invented certain new and useful Improvements in Feed-Water Heater, Lime-Extractor, and Condenser; and we do hereby declare that the following is a full, clear, and exact description thereof, reference being had to the accompanying drawings, and to the letters of reference marked thereon, in which—

Figure 1 is a vertical section.

The nature of our invention consists in the arrangement of an alternate series of concave and convex disks within a cylindrical casing, said disks acting in combination with a distributing-cone and concave water-receiver for the purpose of so distributing the water when it is received into the heater, and while passing downward through the same, that it is most effectually exposed to the heating action of exhaust steam which is at the same time passing in a reverse direction through a vertical centre pipe, which is so perforated at intervals as to allow the steam to escape, as will be more fully described.

To enable others skilled in the arts to make and use our invention, we will proceed to describe its construction and operation.

A represents a vertical cylindrical case, which may be constructed in sections, and be jointed together, as seen in the drawings. Case A is provided with a suitable bottom, $a$, which forms its base. $b$ represents a horizontal plate, which fits snugly to the inner side of the cylindrical case, so as to be water or steam-tight. This plate is so perforated at its centre as to admit the insertion of a pipe, $c$, which pipe extends vertically upward to near the top of the case. $e$ represents a perforated horizontal plate, which also fits snugly into the case and around the tube $c$. Straw $f$ is placed upon the upper surface of plate $e$ for filtering purposes. B B B represent convex disks, which are formed around and secured to pipe $c$. Their diameter is somewhat less than the diameter of the inside of the case. Hence, when the disks are in position, there is a narrow circular space extending entirely around them. Immediately below these disks pipe $c$ is perforated, as seen at $k$ in the drawings, for the purpose of permitting the escape of steam into the case. The upper end of said pipe is also open for the same purpose. C C C represent concave disks, which are secured to the inner side of the case, and extend to or near pipe $c$, leaving an open space around said pipe, as seen at $g$. D represents a concave flange, which serves as a receiver of water to be heated. This flange is secured to the extreme upper end of pipe $c$, as seen in the drawings. E represents a conical water and steam-distributor, which is constructed as seen in the drawings, and is secured in position by means of a rod, $h$, upon the upper end of which it is mounted in such a manner that it may be elevated or depressed at pleasure by means of a screw-rod, $h$, which extends thence vertically downward through the base of the apparatus, and serves as a tie to secure the sections together. F represents the water-feed pipe, which is provided with a stop cock, $i$, to regulate the flow of water. Said pipe F is positioned in the centre of the cover $j$, and exactly over the apex of the conical water-distributor E. H represents the exhaust-steam or induction pipe. I represents the steam-exit pipe. J represents the water pipe which connects with the pumps. K represents the "blow-off" cock.

Having described the construction of our apparatus, we will now proceed to describe its operation, which is as follows: The exhaust steam is admitted through pipe H, which fills the space between the base $a$ and disk or plate $b$, which creates an intense heat, which is imparted to the water in the reservoir immediately above it. The steam passes thence upward through pipe $c$. In its upward passage a large portion of it escapes through the perforations $k$, and is thus radiated on the under surface of disks B B B to their outer edges. It rises thence vertically until it strikes the under surface of disks C C C, where it is forced towards the centre, along the under surface of said disks, where it is allowed to escape upward until it strikes the under surface of the next succeeding disk, and is forced outward, as before, together with that which is also escaping from the perforations formed in the pipe at this point. Thus it will be seen that the steam is constantly forced from the centre to the outside and back again until it has ascended through the entire series of disks, imparting an intense heat to them. That portion of the steam which does not pass out through the perforations passes upward and out at the top of the pipe, and strikes on the under surface of the conical water-distributor, and by it is deflected from its course, and is radiated horizontally until it is enabled to pass upward around its edge and escape thence through the escape pipe. While the steam is thus passing upward water is admitted through the water pipe, and falls directly upon the apex of the conical distributer. In passing thence to its edges it becomes somewhat distributed or spread out into a thin sheet, which, as it falls from the edge, is acted upon by the current of steam which is passing from the under surface of the cone, and is thrown into a thin spray as it falls into the receiver D, or is thrown over its edges, as the case may be. The force of the current of steam is governed by elevating or depressing the cone, as before described. The principal object of this reservoir is to retain the water during the intervals of the exhaust. The water passes thence over the edge of receiver, and falls on to the first disk of the series, and passes over it towards its centre, until it falls through the apertures of this disk on to the next succeeding disk, and runs thence to its periphery, and again falls on to the next in its order, thus running alternately from the centre to the periphery, until it has reached the bottom, where it is filtered by the straw, and passes into the reservoir below. It will be readily seen that water in mingling with the steam and passing over the heated plates in thin sheets must become intensely heated, and it is retained in this condition for so long a time while passing through the apparatus that all of the metallic salts or aluminous combinations, or other foreign matters contained in the water, become thoroughly precipitated, and are filtered out, so that nothing but pure water is admitted into the boiler.

What we claim as new, and desire to secure by Letters Patent, is—

1. We claim the centre pipe c, in combination with concave and convex disks, for the purpose of distributing the water and steam, in the manner and for the purposes described.

2. We claim the water and steam-distributor E, the same being constructed in the manner and for the purposes described.

3. We claim the concave disk D, in combination with the water and steam-distributor E, the same being constructed and operated in the manner and for the purpose specified.

WILLIAM CRIGHTON,
WILLIAM WILLS,
LOUIS RASTETTER.

Witnesses:
 GEO. W. JONES,
 A. J. PARSHALL.